2,811,549
Patented Oct. 29, 1957

2,811,549

PROCESS OF PREPARING HIGH SOLIDS β-ALANINE DETERGENTS

David Aelony, Minneapolis, Minn., assignor to General Mills, Inc., a corporation of Delaware No Drawing. Application February 23, 1954, Serial No. 412,091

5 Claims. (Cl. 260—534)

The present invention relates to a process of preparing β-alanine detergents having the formula

RNHCH$_2$CH$_2$COOX in which R is a long chain aliphatic hydrocarbon group containing from 8 to 22 carbon atoms and X is a salt forming group such as sodium potassium, ammonium and substituted ammonium groups.

Detergents of the above type are disclosed in the Isbell Patent 2,468,012. These are prepared by the condensation of primary fatty amines with lower alkyl esters of acrylic acid such as the methyl, ethyl, propyl and butyl esters. The reaction involves the addition of the primary amine to the double bond of the acrylate to obtain the ester corresponding to the above identified compound. This ester is then hydrolized by means of aqueous alkali to obtain the corresponding salt.

It has now been discovered that it is possible to prepare high quality β-alanine detergents of the above type by starting with an undistilled amine. The product can be obtained in the form of a high solid aqueous product which is free from materials which interfere with the foaming properties of the detergent.

It is, therefore, an object of the present invention to provide a novel process of preparing β-alanine detergent products of the above type starting with undistilled fatty amines.

The invention is based upon the discovery that it is possible to extract any foam depressants which may be present in the solid saponified detergent obtained from undistilled amines. The exact nature of the foam depressants is not known, but it has been observed that by subjecting the solid saponified detergent product to extraction with an organic solvent which does not gel the reaction mixture, it is possible to remove materials which depress the foaming action of the detergent.

In carrying out the invention, the ester adduct of the primary fatty amine and the acrylic ester may be prepared as described in the Isbell patent or in any other way. The ester adduct thus obtained is then subjected to saponification with a strong alkali in the form of an aqueous solution containing from 15 to 70% solids. Employing approximately the required amount of alkali in the concentrations referred to above, the saponification reaction mixture is an essentially solid mixture from which the alcohol liberated in the saponification may be removed by vaporization. The product remaining is essentially solid although it may contain small quantities of water left from the saponifying alkali.

In place of salt derived by saponification of the ester adduct referred to above, the invention may be applied to the salts obtained by neutralizing the adduct of acrylic acid and a primary amine or of β-propiolactone and a primary amine.

This saponification reaction mixture is then subjected to extraction with a non-gelling organic solvent. A variety of solvents may be employed for this purpose. Any of the usual organic solvents which do not gel the reaction mixture may be used. Suitable solvents include such materials as ethyl acetate, dioxane, acetonitrile, methyl ethyl ketone, ethylene dichloride, carbon tetrachloride, 99% isopropanol, nitroethane and 1-nitropropane. Whether or not a particular organic solvent is a gelling or a non-gelling solvent can readily be determined by a simple application of the solvent to the saponification reaction mixture.

The ratio of solvent to solid material is not critical nor is the procedure by means of which the extraction is accomplished. Thus, any quantity of solvent by means of which it is possible to wet the solvent reaction mixture and remove an extract, is sufficient. Any larger quantity of solvent may be employed within economic limitations. Similarly any extraction equipment or technique may be employed whether continuous or batch. These techniques are well-known and need not be elaborated here.

The exact nature of the foam depressants in the reaction mixture is not known. These may be secondary fatty amines, fatty nitriles or other materials present in the original starting material, or they may be other compounds formed when the amine mixture and acrylic ester are combined. Whatever the nature of the foam depressants, it has been observed that they are removed by means of this treatment. Thus when the saponification reaction mixture is extracted with one of these solvents, it is noted that the foaming properties improve. These same foaming properties are again impaired when some of the extract is added back to the detergent.

Example 1

In this example a crude cocoamine was employed from which the C$_6$, C$_8$ and most of the C$_{10}$ fractions had been removed by stripping during the processing operations. The C$_{12}$, C$_{14}$ and higher amine fractions, however, had not been distilled. The product had an amine number of 224, an iodine value of 12.3, a primary amine content of 75.7% and a secondary amine content of 9.5%. The cocoamine (250.5 parts) was heated to 100° C. at 10 mm. for several minutes and was then cooled to 60° C. Thereafter, methyl acrylate (94 parts) was added at once and the temperature was maintained at 60° C. for four hours. The resulting product was heated to 100° C. at 350 μ to remove volatile products. A residue (334 parts) resulted. This ester was agitated with 80 parts of boiling 50% sodium hydroxide solution. A solid product resulted which was dried in vacuo.

The dried material (186 parts) was extracted three times successively with portions (300 parts) of ethyl acetate. Successively less material was removed as the extraction progressed. From the 186 parts of material employed for the extraction there resulted 151 parts or 81% of residue. The extracted material was obtained by evaporation of the ethyl acetate solution. A residue resulted which weighed 29 grams.

The efficacy of the extraction was demonstrated by standard Ross Miles foam tests. The crude material prior to extraction gave a foam height of 105 mm. which fell to 99 mm. after 5 minutes. The extracted product, however, gave an immediate foam height of 162 mm. which fell to 156 mm. after 5 minutes. These Ross Miles tests were run at 0.1% concentration in distilled water at a pH of 10. When a 0.1% solution of sodium N-distilled coco β-amino propionate (Ross Miles 171 mm.) was mixed with the extract from sodium undistilled coco β-amino propionate (9:1) the Ross Miles test dropped to 49 mm.

While the above example illustrates the application of the process to undistilled cocoamines, the invention may be applied in the same manner to β-alanine detergents prepared from other undistilled amines containing from 8 to 22 carbon atoms. These may be single isolated amines or they may be selected fractions of the amines prepared from the fatty acids of a fat or oil. Likewise, the amines which are employed may be either saturated or unsaturated or mixtures thereof. Similarly, the variety of solvents referred to herein, may be used to carry out the same process. Additional solvents which meet the requirements described herein may also be used.

I hereby claim as my invention:

1. Process of improving the foam characteristics of a β-alanine detergent having the following formula:

$$RNHCH_2CH_2COOX$$

in which R is an aliphatic hydrocarbon group containing from 8 to 22 carbon atoms and X is a salt forming group, which detergents have been prepared from undistilled fatty amines, which comprises extracting said detergent with an organic solvent for foam depressants which is non-gelling to the detergent said solvent being selected from the group consisting of ethyl acetate, dioxane, acetonitrile, methyl ethyl ketone, ethylene dichloride, carbon tetrachloride, 99% isopropanol nitroethane and 1-nitropropane.

2. Process according to claim 1 in which the fatty amines employed are undistilled coco fatty amines.

3. Process of improving the foam characteristics of a β-alanine detergent derived from a fatty amine and having the following formula: $RNHCH_2CH_2COOX$ in which R is an aliphatic hydrocarbon group containing from 8 to 22 carbon atoms and X is a salt forming group, said detergent product being the solid reaction mixture obtained by the hydrolysis of the compound $$RNHCH_2CH_2COOR_1$$

in which $R_1$ is a lower alkyl group, which hydrolysis is accomplished by means of aqueous sodium hydroxide containing from 15 to 70% sodium hydroxide, which comprises subjecting the solid reaction mixture to extraction by means of an organic solvent for foam depressants which is non-gelling to the reaction mixture said solvent being selected from the group consisting of ethyl acetate, dioxane, acetonitrile, methyl ethyl ketone, ethylene dichloride, carbon tetrachloride, 99% isopropanol nitroethane and 1-nitropropane.

4. Process according to claim 3 in which the fatty amines are derived from undistilled cocoamines.

5. Process according to claim 3 in which the solvent is ethyl acetate.

No references cited.